Patented Apr. 23, 1946

2,399,055

UNITED STATES PATENT OFFICE 2,399,055

RESINOUS PRODUCTS FROM FURFURYL ALCOHOL AND PROCESS OF MAKING THE SAME

Birger W. Nordlander, Schenectady, N. Y., assignor to General Electric Company, a corporation of New York No Drawing. Application February 27, 1942, Serial No. 432,638

22 Claims. (Cl. 260—92.6)

This invention relates to resinous materials obtained by heating furfuryl alcohol in the presence of an organic compound containing a halogenated aliphatic radical. It is more particularly concerned with the preparation of liquid, polymerizable, resinous products from compositions comprising furfuryl alcohol. Such liquid products can be stored at room temperature for considerable periods of time in the absence of air without solidifying but are rapidly polymerized to an insoluble, infusible state on heating. The invention is specifically concerned with the preparation of such resinous compositions, employing as catalysts for the reaction organic compounds capable of slowly liberating catalytic concentrations of hydrogen halide during the course of the resinification reaction.

It was known prior to my invention that furfuryl alcohol or mixtures of furfuryl alcohol and furfural could be resinified in the presence of acid catalysts such as the mineral acids. For example, when furfuryl alcohol is mixed with 1 to 2 per cent by weight thereof of concentrated hydrochloric acid, a vigorous exothermic reaction occurs. So much heat is evolved that within a few minutes' time a black, insoluble, infusible resinous mass is formed. By taking considerably less acid, say a tenth of the above quantity, the reaction can be controlled to a certain extent and will occur only very gradually at room temperature. However, upon heating to above 80° C. the exothermic reaction sets in and, even with elaborate arrangements for cooling the reaction mixture, it is difficult to control the reaction so that soluble, fusible, potentially convertible intermediate products of any desired viscosity may be obtained. As an additional means of control, it has also been proposed to carry out the reaction in the presence of a large quantity of water. The product is an extremely viscous or semi-solid mass containing large amounts of water which can not be readily or completely removed without additional hardening of the remaining resinous mass.

Control of the resinification reaction may be obtained by using a variable catalyst concentration, i. e., by initiating the reaction with a very low catalyst concentration and gradually increasing the catalyst concentration as the concentration of the reactant decreases. This method will result in a reduction of the reaction rate during the initial, most critical period of the strongly exothermic reaction and a subsequent increase in the rate of reaction during the final, less critical period of the reaction when the reactant concentration has decreased. In carrying out the resinification reaction in accordance with this scheme, it obviously would be more convenient to use some catalyst source material which could be added to the reaction mass at the start of the reaction in the total amount required and which would be stable at room temperatures and gradually release an acid only upon heating at temperatures appropriate for carrying out the reaction.

The present invention is based on my discovery that halogenated compounds holding halogen in aliphatic radicals, from which upon heating halogen is split off in the form of hydrogen halide, can be used to great advantage for the above purpose. The hydrogen required to form the hydrogen halide may be furnished either by the same molecule yielding the halogen atom or by some other molecule of the same or different kind, including the reactant or reactants undergoing resinification. As examples of compounds of this type the following may be mentioned:

Chlorinated hydrocarbons of the aliphatic, alkyl-aromatic or alicyclic class, including chlorinated rubber, chlorinated kerosene, tetrachloro toluol, benzal chloride, chlorinated tri-isobutylene, chlorinated turpentine, cyclo hexyl chlorides, etc.

Chlorinated aliphatic (including aryl-alkyl) alkyl-aromatic or alicyclic, alcohols such as alpha dichloro hydrine, 2-chloroallyl alcohol, phenyl ethylene chlorhydrine, β-chloro ethyl-benzyl alcohol, chloro cyclohexanol, etc.

Chlorinated aliphatic (including aryl-alkyl) alkyl-aromatic or alicyclic acids such as chlorinated stearic acid, chlorinated toluic acid, chlorinated abietic acid, etc.

Chlorinated aliphatic, alkyl-aromatic or alicyclic ketones and aldehydes, such as chlorinated methyl isobutyl ketone, chlorinated 2-ethyl-hexene-al, chlorinated heptaldehyde, chlorinated fenchone, etc.

Chlorinated alkyl (including aryl-alkyl) alkaryl or alicyclic esters of either simple or mixed type, including fatty oils, synthetic resins containing fatty oil acid or other aliphatic, alicyclic or alkyl-aromatic groups or radicals; also alkyl, alkaryl or alicyclic phosphates or carbonates such as chlorinated tricresyl phosphate, chlorinated butyl carbonate, etc.

The corresponding bromine and iodine compounds may also be employed but since they are more expensive the chlorinated compounds are preferred. The above list shows a large variety of monomeric organic compounds containing a heat-releasable hydrohalide-forming halogen in an aliphatic radical of said compounds.

In the classes of aromatic compounds mentioned above halogen may also be substituted in the aromatic ring, but since such halogen is very stable its presence or absence is of no significance with respect to the objectives of the present invention.

It will be noted that in all of these substances, broadly referred to as catalyst source materials, the effective halogen is originally introduced into the reaction mass in a halogenated alkyl group or radical and is slowly released therefrom to form the hydrogen halide catalyst. These source materials are thus chemically different from the placid or mild catalysts, i. e., the mineral acid salts of organic nitrogenous compounds, such as urea hydrochloride, ethanol amine hydrochloride, etc., described and claimed in the application of Edmond T. Fiedler and Gustave D. Holmberg, Serial No. 326,054, filed March 26, 1940, now U. S. 2,345,966, issued April 4, 1944, and assigned to the same assignee as the present invention.

In converting furfuryl alcohol compositions to potentially reactive, resinous products of practical value in accordance with my invention, the halogen-containing material of the type described is added to the furfuryl alcohol and the mixture heated until the desired degree of resinification has been obtained. The amount of halogenated material taken depends on several factors such as the degree of halogenation, i. e., potential amounts of hydrogen halide that may be liberated, relative ease at which this material is split off upon heating, the reaction temperature and the means of controlling the reaction temperature. The latter factor is contingent upon variables such as type of vessel, size of batch, stirring arrangement, etc.

An increase in the temperature not only speeds up the resinification rate by its direct effect on this reaction, but also by its effect on the rate of release of hydrogen halide from the halogenated material used. The maximum reaction temperature that may be maintained therefore will vary with the concentration and chemical composition of the particular halogenated compound used. It should not be so high that the amount of heat liberated in the exothermic reaction materially exceeds the heat losses from the reaction vessel by conduction or radiation. For practical reasons, it is preferable to carry out the reaction in such a manner that a small amount of heat has to be supplied in order to maintain the reaction temperature at the appropriate level. In general, it is advisable to use reaction temperatures not higher than 150° C., preferably between 80–125° C.

In small scale production, where the heat of reaction may readily be dissipated, it is possible to use a larger concentration of halogenated catalyst source material and a higher reaction temperature, and in consequence a shorter process time than in large scale manufacture where the temperature is less readily controllable.

If care is taken to avoid loss of liberated hydrogen halide by maintaining an efficient reflux, the halogenated material does not, in general, need to be taken in an amount greater than that which, during the entire reaction, will liberate up to 2 to 3 per cent hydrogen halide based on the weight of the furfuryl alcohol. In most instances, it will suffice if the quantity of hydrogen halide is between 0.1 to 1 per cent.

The resinification of furfuryl alcohol which occurs in the presence of acids has generally been regarded as a polymerization reaction involving the double bonds on the furane rings. I have come to the conclusion, however, that the fundamental reaction is actually a condensation reaction, probably of the type that occurs in the condensation of phenol alcohols, methylol ureas, methylol melamines, etc. This conclusion is based on the fact that water is formed in the reaction. Furthermore, furfuryl alcohol is not resinified to any appreciable extent by polymerization catalysts such as benzoyl peroxide at 80–100° C. as would be the case if direct polymerization were involved. Polymerization does take place in the presence of air (oxygen) particularly at higher temperatures, but the mass or bulk resinification effected by the acidic catalyst is no doubt primarily the result of a condensation reaction. Since water is a byproduct of the resinification reaction it is advisable to remove it either continuously during the reaction or at the end of it by distillation at atmospheric or reduced pressure.

Depending upon how far the resinification reaction is allowed to proceed, products varying from fluid to viscous, sticky resins may be prepared in accordance with my process. If it is necessary to store the products for a prolonged time, it may be advisable in some instances to remove or neutralize the freed acid in some way, for example by evaporation or by the addition of a suitable inorganic or organic base. Additional catalyst source material may be added to the resinous product, either in its original or neutralized condition, to speed up its cure upon application of heat. Since the halogenated materials employed as catalyst source materials are quite stable at room temperature, their additional incorporation at this stage has no appreciable effect on the shelf life of the resinous products.

The fluid resinous products of low viscosity may be used alone, or in combination with suitable fillers or modifiers as solventless varnishes, for various impregnation, coating and casting applications, binders for wood, paper, cloth, glass, asbestos, or the like, as wire enamels, etc. The more viscous products may be used similarly after dilution with a suitable solvent.

The conversion of the resinous products to the insoluble and infusible state is effected by heating at elevated temperature, preferably at 75 to 150° C. with or without the application of pressure. The farther the initial condensation has been carried the shorter the cure time of the product. Since water is also formed during this final curing step due to the continuation of the condensation reaction by which the intermediate soluble and fusible products were produced, it may be desirable in order to avoid the formation of pores and bubbles in cast or molded products, to carry out the conversion, i. e., control the curing temperatures, in such a manner that the rate of formation of water does not exceed the rate of its diffusion out of the product. Another way of avoiding the formation of voids is to admix with the intermediate heat-hardenable products a small amount of a water absorbing agent such as Portland cement, plaster of Paris, etc., which will take up the water of reaction.

While the polymerizing effect induced by oxygen is comparatively small at lower temperatures, i. e., at room temperature, or thereabouts, such an effect is very markedly prevalent on the surface of the liquid resin products at higher temperatures. For example, a syrup containing a very small amount of free hydrogen halide and/or a low concentration of a source material for such catalyst generally will cure very slowly at 150° C. However, in thin films and in the presence of air, a thorough cure of the material will occur at temperatures of about 150° C. in the course of a few hours to form very hard, lustrous films having remarkable solvent resistance.

I have also found that by incorporating small amounts of driers into the fluid furfuryl alcohol resinification products, compositions may be obtained which exhibit under ordinary atmospheric conditions air-drying properties commensurable with those of the common drying oils, for example, linseed oil. These oxygen-convertible products may, in many cases, be used in place of such drying oils, particularly where harder finishes are desirable.

The thoroughly cured products prepared in accordance with the above processes are characterized by great hardness, good mechanical strength, good adhesion to a base material, outstanding water, alkali, acid- and solvent-resistance and satisfactory dielectric properties. The products may be modified by a variety of natural and synthetic materials, which may be added to the reaction mixture prior to the carrying out of the initial resinification reaction but preferably are incorporated into the liquid, potentially reactive intermediate products before the final conversion thereof. Among such modifiers which may be incorporated over a wide range of proportions are shellac, copal, rosin, coumarone, etc.; proteins, as for example zein, casein, etc.; cellulose esters and ethers; polymeric products such as polyvinyl acetals, polyvinyl alcohols, polystyrene, polyacrylates, etc., and various copolymers of the corresponding monomeric substances; alkyd resins, including those which may be prepared from alpha unsaturated alpha, beta polycarboxylic acids; fatty oils and their acids; monomeric polymerizable substances such as allyl esters, vinyl acetate, styrene, acrylic acid esters, etc. or mixtures thereof, which subsequently may be made to polymerize by the action of catalysts and heat; various plasticizers such as tricresyl phosphate, dibenzyl sebacate, etc. Other materials which may be thus incorporated and which may co-condense with the furfuryl alcohol and its condensation products are phenols, urea, amines and/or the aldehydic resinous reaction products thereof; aldehydes such as furfural, etc.

Of the halogenated materials listed above I have found chlorinated alkaryl phosphates especially useful as catalyst source materials for the resinification of furfuryl alcohol. I prefer chlorinated tricresyl phosphates averaging up to 9, preferably from 1 to 3, atoms of chlorine per molecule substituted in the alkyl (methyl) groups (corresponding to from 9 to 22 per cent, alkylsubstituted chlorine by weight) as such compounds will gradually release hydrogen chloride at 100–150° C. at a rate at which the resinification reaction may be easily controlled. The amount of source material to be taken depends upon the factors previously discussed.

The following examples are illustrative of how the resinification may be carried out with such chlorinated materials.

*Example 1*

Parts by weight
Furfuryl alcohol_____ 100
Chlorinated tricresyl phosphate, holding about 20 per cent chlorine in the side chains _____ 1

The above ingredients were mixed and heated for 3¼ hours at about 110° C. in a three-necked flask equipped with a stirrer, a thermometer, a reflux column with a side arm outlet attached to a condenser, and an inlet tube for a gaseous medium, in the present example, an inert atmosphere, specifically nitrogen, used to facilitate the removal of the water formed during the reaction. The reflux temperature at the outlet was not allowed to exceed 102° C. A gentle slow resinification took place yielding a dark-colored, fairly fluid, syrupy product. The syrupy product was readily soluble in benzene, toluene, carbon tetrachloride, ethylene dichloride, acetone, furfural, furfuryl alcohol, benzyl alcohol, dioxan, aniline, pyridine, cresol, ethyl acetate, diallyl phthalate, dibutyl phthalate, tricresyl phosphate, dibenzyl sebacate, ethyl acrylate, vinyl acetate, etc. On the other hand, it was insoluble in water, methyl alcohol, ethyl alcohol, butanol, ether, petroleum ether, mineral spirits. The fluid consistency of this product makes it useful as a solventless varnish for various coating, casting and impregnating applications. The viscosity may be adjusted by the addition of a small amount of solvent. If furfuryl alcohol is used for this purpose the solventless character of the product will essentially be maintained, since a part of this solvent will co-condense with the resinous product during the curing process.

When spread out in the form of thin layers on glass, three hours' heating at 150° C. or overnight at 110°–115° C. converted the product into a lustrous, infusible and insoluble material which adhered tenaciously to the base and possessed a remarkable hardness even at the respective curing temperatures. The solvent resistance improved with increasing cure time. A film heat-cured in air overnight remained unchanged when immersed in acetone for several days. In the preparation of cast products a thorough, hard cure was effected upon heating for 15 hours at 105–110° C.

*Example 2*

Parts by weight
Furfuryl alcohol_____ 100
Chlorinated tricresyl phosphate, containing about 20% chlorine in the side chains_____ 5

A mixture of the above ingredients was heat-reacted with constant stirring at 110–115° C. in the presence of air. A fairly rapid resinification occurred and after 90 minutes' heating a black, highly viscous syrup had formed. This syrup exhibited solubility and curing characteristics similar to those of the preceding product.

*Example 3*

Parts by weight
Furfuryl alcohol_____ 100
Chlorinated tricresyl phosphate, holding about 9% chlorine in side chains_____ 10

The mixture was heated in the presence of air with stirring at 110–115° C. for 2½ hours, during which time it gradually became more viscous. The product consisted of a black, rather viscous syrup having the same solubility characteristics as the product of the preceding examples. When heated for 2 hours at 150° C. it set up to a hard, infusible and insoluble material. As compared with the corresponding end products of the previous examples, this material was considerably more flexible due to the larger amounts of chlorinated tricresyl phosphate used which, besides acting as a catalyst source material, also functions as a plasticizer.

As illustrations of how the controlled resinification of furfuryl alcohol may be carried out with other catalyst source materials of the general class specified above, the following additional examples are given.

Example 4

| | Parts |
|---|---|
| Furfuryl alcohol | 100 |
| Methyl trichlorostearate | 5 |

Using the same apparatus as in Example 1 and a flow of nitrogen, this mixture was heated for 2½ hours at 135–140° C. A slow, gentle resinification took place, yielding a dark-colored, fairly fluid syrup. When utilized as a casting material, the product cured slowly upon heating. After 5 hours' heating at 150° C., the product was still fluid, but further heating for a total of 20 hours at this temperature produced a very hard, rigid, infusible casting. The curing rate under these conditions could be speeded up very efficiently by the addition of a small amount of a more effective catalyst source material. For example, the addition of 1–3 per cent chlorinated tricresyl phosphate holding 20 per cent Cl in the side chains made it possible to convert the cast product into a hard, infusible material in a few hours' time at 140–150° C. In the form of thin layers or films on glass or metal bases, the fluid product yielded dense, lustrous, hard films upon heating at 150° C. overnight. These films possessed outstanding solvent resistance.

Example 5

| | Parts |
|---|---|
| Furfuryl alcohol | 100 |
| Chlorinated tri-isobutylene holding 55% chlorine | 2 |

This mixture was heated under the conditions of Example 1, except that the temperature was held at about 100–115° C. A fairly rapid resinification occurred, and after one hour's heating a quite viscous syrup had formed. This syrup showed similar solvent and curing characteristics as the product of Example 1.

Example 6

| | Parts |
|---|---|
| Furfuryl alcohol | 100 |
| Alpha dichlorohydrin (sym. dichloro isopropyl alcohol) | 2 |

The solution was heated for 4 hours at about 145–150° C. using the apparatus described in Example 1 and a flow of nitrogen. A slow resinification took place, yielding a fairly fluid syrup. When heated for 15 hours at 150° C., this syrup became somewhat more viscous; 5 hours' further heating at this temperature yielded a rubbery gel. When exposed in thin layers to the air for 15 hours at 150° C., a thorough cure was effected with the formation of very hard, smooth, lustrous films having outstanding solvent resistance.

That resinification in this example was caused by the catalyst liberated from the source material and was not merely due to the long heat treatment at the relatively high temperature employed is shown by the fact that when furfuryl alcohol was heated under the above conditions for 15½ hours at a temperature of 145–150° C. in the absence of any catalyst, no measurable change in the viscosity of the alcohol was noted and only a trace of volatile matter was collected.

As in the case of the material of Example 5, the addition of a small amount of a more active source material such as chlorinated tricresyl phosphate made it possible to convert castings of the syrup of Example 6 into an infusible, insoluble material in a relatively short time. For example, with the addition of 5 per cent chlorinated tricresyl phosphate holding 20 per cent Cl in the side chains, a hard, infusible material formed upon heating for 1½ hours at 150° C. These results bring out the fact previously referred to that the soluble and fusible intermediate condensation products of furfuryl alcohol, obtained in accordance with the process described, may be converted into infusible and insoluble materials upon heating by the action of (1) an acidic catalyst, i. e., by condensation, (2) oxygen, viz. by polymerization, or (3) by a combination of the two processes.

Example 7

| | Parts |
|---|---|
| Furfuryl alcohol | 100 |
| 2-chloroallyl alcohol (freshly distilled) | 5 |

This mixture was heated under total reflux conditions for 1½ hours. During this time the temperature of the reaction mixture gradually dropped from 150° to 116° C. due to the formation of water of reaction. The reaction was continued for 1½ hours under the conditions of Example 1 at an average temperature of 130° C. The product obtained consisted of a fairly fluid, dark syrup. After 7 months' storage at room temperatures, this syrup showed no change in viscosity. At elevated temperatures it cured slowly in bulk yielding hard, tough, somewhat flexible products after being heated for 15 hours at 150° C. The addition of 3 per cent chlorinated tricresyl phosphate (20 per cent Cl in side chains) markedly accelerated the cure in bulk so that a hard, tough material resulted upon heating for 1½ hours at 150° C. When the syrup was spread out in the form of a thin layer on glass, a smooth, lustrous, hard, infusible, substantially insoluble film formed on 4 hours' heating in air at 150° C. When heated overnight, the film became exceptionally solvent-resistant. At room temperature the conversion of such thin layers was very slow. However, when a small amount of a drier was incorporated, the product air-dried quite rapidly. For instance, films of a varnish containing the syrupy product of this example, diluted with one-third part toluene, and an amount of naphthenate drier which supplied 0.30% Pb, 0.03% Co and 0.12% Zn based on the weight of the syrup dried to tack-free, hard films in 20 hours at room temperature. A similar varnish containing 0.38% Pb, 0.02% Co and 0.04% Mn air-dried to a tack-free product in 15 hours. The resulting films were considerably denser and harder than those obtained from linseed oil in the same length of time using the above or other drier combinations.

By the incorporation of driers the baking time required to convert the syrup into a solvent-resistant film can be shortened considerably. For example, the above varnish containing 0.30% Pb, 0.03% Co and 0.12% Zn when flowed out in a thin film required only 1 hour's baking at 150° C. to form a thoroughly converted, very solvent-resistant film. The incorporation in the syrup of 5–10 per cent or more of materials such as Formvar (polyvinyl formal), Gelva (polyvinyl alcohol), zein, or cellulose acetate materially improved the toughness of the cured films.

By refluxing the furfuryl alcohol-chlorallyl alcohol mixture of Example 7 for 2 hours and then continuing the reaction for 3 hours under distillation conditions, as in Example 1, at temperatures gradually increasing from 120° to 169° C., a very viscous syrup was obtained. This syrup was dissolved in an equal amount by weight of toluene. The resultant varnish air-dried in 3 hours without the addition of driers to form a tack-free film. On further exposure to air and light this film took on a fine wrinkled appearance. On the other hand, when this varnish was allowed to air-dry in the absence of light, smooth, lustrous, flexible films were obtained. Air-blowing of the resin base at elevated temperatures materially decreased the tendency of the resin to dry to a wrinkled or frosted state in the presence of light.

What I claim as new and desire to secure by Letters Patent of the United States is:

1. A resinous composition comprising the product obtained by resinifying under heat furfuryl alcohol in the presence of a catalyst source material consisting of a monomeric organic compound containing a heat-releasable hydrohalide-forming halogen in an aliphatic radical of said compound.

2. A resinous composition comprising the heat reaction product of furfuryl alcohol in the presence of a catalyst source material consisting of a monomeric organic compound containing a heat-releasable hydrohalide-forming halogen in an alkyl radical of said compound.

3. A liquid, potentially reactive product obtained by resinifying a mixture of furane derivatives containing furfuryl alcohol in the presence of a catalyst source material consisting of a monomeric organic compound containing a halogenated alkaryl radical with at least a part of the halogen in the alkyl group, the halogen in the alkyl group being a heat-releasable, hydrohalide-forming halogen.

4. A heat-convertible resinous composition comprising the product obtained by resinifying furfuryl alcohol under heat and in the presence of an organic ester of phosphoric acid containing halogen in an alkyl radical thereof.

5. A resinous composition comprising the product obtained by resinifying furfuryl alcohol under heat and in the presence of a halogenated tricresyl phosphate containing at least one halogen atom in a methyl radical thereof.

6. A resinous composition comprising furfuryl alcohol heat resinified in the presence of from 1 to 10 per cent by weight of chlorinated tricresyl phosphate containing chlorinated methyl radicals.

7. A resinous reaction product obtained by heating furfuryl alcohol in the presence of a halogenated alkaryl phosphate ester containing a halogenated alkyl radical.

8. A resinous composition comprising the product obtained by heat reacting furfuryl alcohol in the presence of a catalyst source material consisting of a monomeric halogenated aliphatic compound, said compound containing a heat-releasable, hydrohalide-forming halogen.

9. A resinous composition comprising the product obtained by heat reacting furfuryl alcohol in the presence of a catalyst source material consisting of a monomeric alcohol containing a heat-releasable, hydrohalide-forming halogen.

10. A resinous composition comprising the product obtained by reacting furfuryl alcohol in the presence of a catalyst consisting of dichloro isopropyl alcohol.

11. The method of producing a liquid resinous reaction product of furfuryl alcohol which comprises (1) mixing the furfuryl alcohol with a catalyst source material consisting of a monomeric organic compound which contains chlorine in an alkyl radical thereof and which is capable of slowly liberating hydrogen chloride on heating, and (2) heating the mixture for a period sufficient to initiate resinification but insufficient to cause the reaction product to solidify.

12. The method which comprises (1) mixing a liquid resinifiable furane derivative comprising furfuryl alcohol with a catalyst source material consisting of a monomeric organic compound containing halogen in an alkyl radical thereof, said compound being capable of releasing a hydrogen halide under heat, and (2) heating the mixture until a liquid resinous mass is formed.

13. The method of forming a polymerizable liquid resinous composition capable of existing in the liquid state for long periods of time at room temperatures in the absence of air which comprises resinifying furfuryl alcohol at an elevated temperature and in the presence of a catalyst source material consisting of a monomeric halogenated organic ester containing a halogenated alkyl radical, said ester being capable when heated of releasing hydrogen halide.

14. The method which comprises heat resinifying furfuryl alcohol in the presence of a chlorinated tricresyl phosphate containing chlorinated methyl groups as a resinification catalyst.

15. An air-drying composition comprising (1) a metal-containing drier and (2) the product obtained by heating furfuryl alcohol in the presence of a catalyst source material consisting of a monomeric halogenated organic compound containing a heat-releasable hydrohalide-forming halogen in an alkyl radical thereof, said heating being applied for a period sufficient to initiate resinification but insufficient to cause the reaction product to solidify.

16. A product comprising the insoluble and infusible composition of claim 1.

17. A heat-convertible resinous composition comprising the product obtained by heating a mixture of furfuryl alcohol and a small amount of a halogenated tricresyl phosphate containing from 1 to 3 atoms of halogen per molecule substituted in the methyl radicals thereof.

18. A resinous composition comprising the product obtained by resinifying under heat a mixture of furfuryl alcohol and from 1 to 10 per cent by weight of a chlorinated tricresyl phosphate containing from 1 to 3 atoms of chlorine substituted in the methyl radicals thereof.

19. The method which comprises heat-resinifying a mixture of furfuryl alcohol and a small amount of a halogenated tricresyl phosphate containing from 1 to 3 atoms of halogen per molecule substituted in the methyl radicals thereof.

20. The method which comprises heat-resinifying a mixture of furfuryl alcohol and from 1 to 10 per cent by weight of a chlorinated tricresyl phosphate containing from 1 to 3 atoms of chlorine substituted in the methyl radicals thereof.

21. An air drying resinous composition comprising (1) the resinous product obtained by heating furfuryl alcohol in the presence of a halogenated tricresyl phosphate containing at least one halogen atom in a methyl radical thereof and (2) a drier.

22. An air drying resinous composition comprising (1) the resinous product obtained by heat-resinifying furfuryl alcohol in the presence of from 1 to 10 per cent by weight of chlorinated tricresyl phosphate containing from 1 to 3 atoms of chlorine substituted in the methyl radicals thereof and (2) a drier.

BIRGER W. NORDLANDER.